United States Patent [19]
Thomas et al.

[11] Patent Number: 5,458,014
[45] Date of Patent: Oct. 17, 1995

[54] WIDE-RANGE MANUAL TRANSMISSION FOR MOTOR VEHICLES HAVING MAIN DRIVE GEARSET

[75] Inventors: Steven G. Thomas, Bloomfield; David A. Janson, Plymouth, both of Mich.

[73] Assignee: Ford Motor Company, Dearborn, Mich.

[21] Appl. No.: 161,623

[22] Filed: Dec. 6, 1993

[51] Int. Cl.⁶ .................................................. F16H 3/08
[52] U.S. Cl. .......................... 74/325; 74/333; 74/339; 475/207
[58] Field of Search ..................... 74/325, 333, 339; 475/207

[56] References Cited

U.S. PATENT DOCUMENTS

| | | |
|---|---|---|
| Re. 33,336 | 9/1990 | Bainbridge et al. ............ 74/333 |
| 1,988,636 | 1/1935 | Thomas et al. . |
| 2,072,380 | 3/1937 | Pfeiffer et al. . |
| 2,127,353 | 8/1938 | Fishburn et al. . |
| 2,127,354 | 8/1938 | Fishburn et al. . |
| 2,138,028 | 11/1938 | Dooley . |
| 2,242,276 | 5/1941 | Vincent . |
| 2,254,334 | 9/1941 | Vincent . |
| 2,514,158 | 7/1950 | Hussain . |
| 2,576,478 | 11/1951 | Beckwith . |
| 2,592,210 | 4/1952 | Swennes . |
| 2,768,534 | 10/1956 | Orr . |
| 2,787,919 | 4/1957 | Senkowski et al. . |
| 3,396,610 | 8/1968 | Rich, Jr. et al. . |
| 3,429,202 | 2/1969 | Galicher . |
| 3,468,192 | 9/1969 | Nasvytis . |
| 3,554,054 | 1/1971 | Nasvytis . |
| 3,572,167 | 3/1971 | Bosko et al. . |
| 3,589,483 | 6/1971 | Smith . |
| 3,654,822 | 4/1972 | Singer et al. . |
| 3,673,890 | 7/1972 | Crooks . |
| 3,837,237 | 9/1974 | Rossler et al. . |
| 4,094,206 | 6/1978 | Sogo et al. ............................ 74/325 |
| 4,282,775 | 8/1981 | Van Dest ............................. 475/207 |
| 4,368,650 | 1/1983 | Numazawa et al. . |
| 4,403,526 | 9/1983 | Numazawa et al. . |
| 4,416,168 | 11/1983 | Arai et al. . |
| 4,523,493 | 6/1985 | Weiss . |
| 4,611,504 | 9/1986 | Rundle . |
| 4,615,240 | 10/1986 | Weiss . |

Primary Examiner—Charles A. Marmor
Assistant Examiner—Peter Kwon
Attorney, Agent, or Firm—Frank G. McKenzie; Roger L. May

[57] ABSTRACT

A multiple-speed ratio transmission mechanism for an automotive vehicle includes a torque input shaft supported on a first axis, and an output shaft and intermediate shaft rotatably supported parallel to the input shaft. Multiple pinion-gear pairs are supported on the three shafts. A planetary gear unit, including a sun gear, ring gear, and a set of planet pinions rotatably supported on a carrier, has its input connected to the intermediate shaft and its output connected to the output shaft. Synchronizers drivably connect a member of the pinion-gear pairs to one of the shafts. A shift mechanism transmits motion of a shift lever to shift forks that move synchronizer sleeves into engagement with the selected gear.

18 Claims, 6 Drawing Sheets

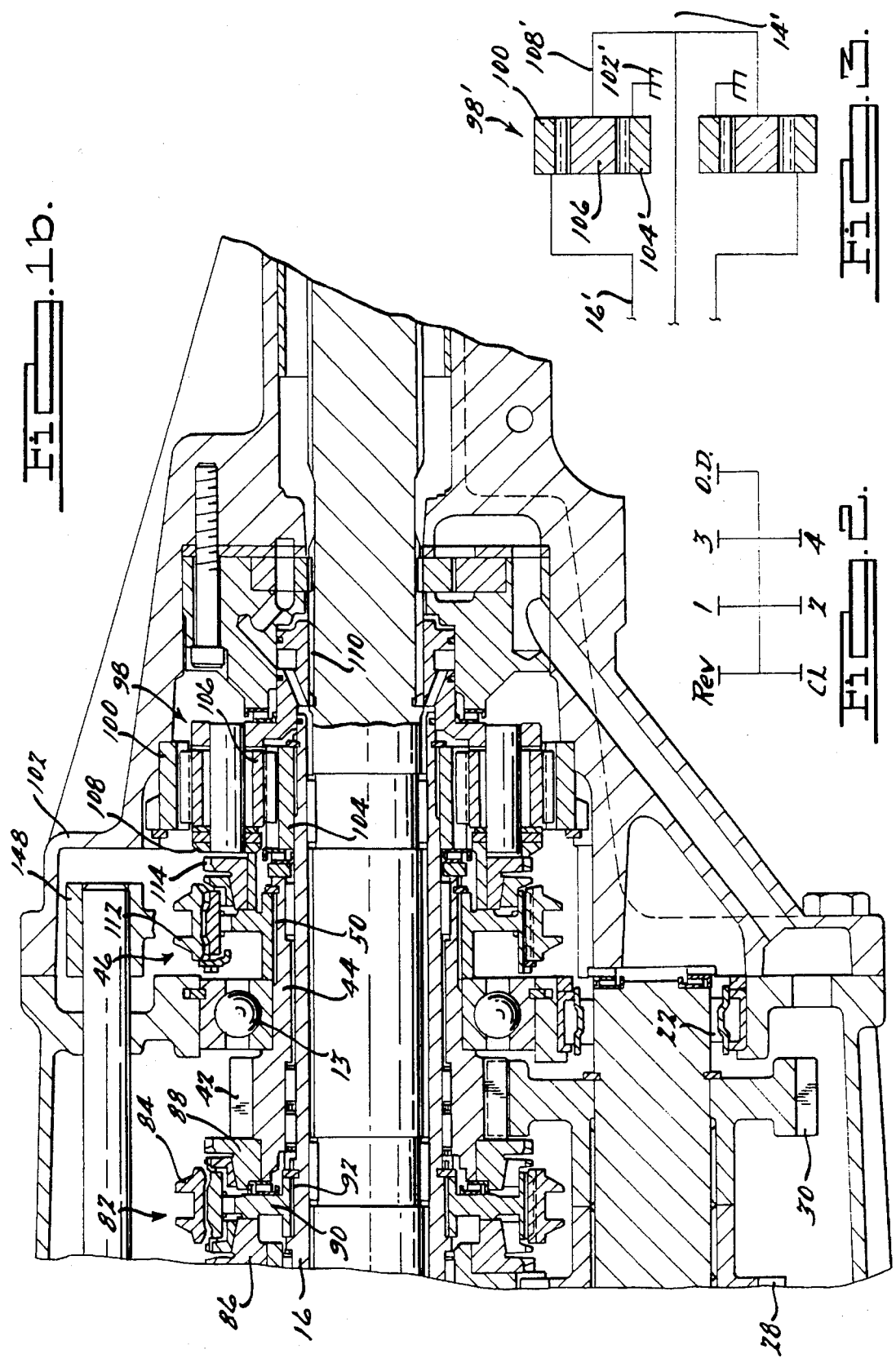

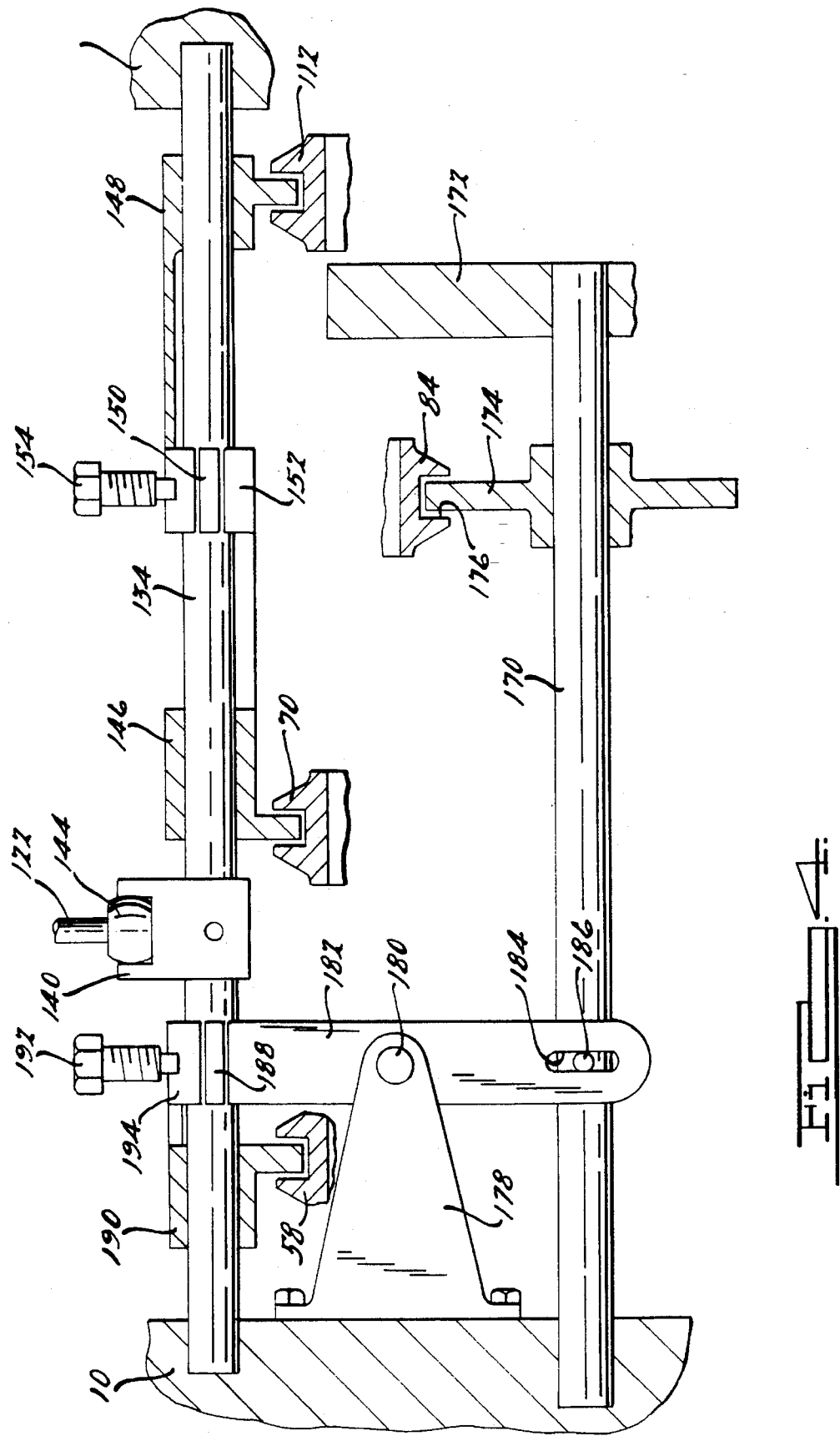

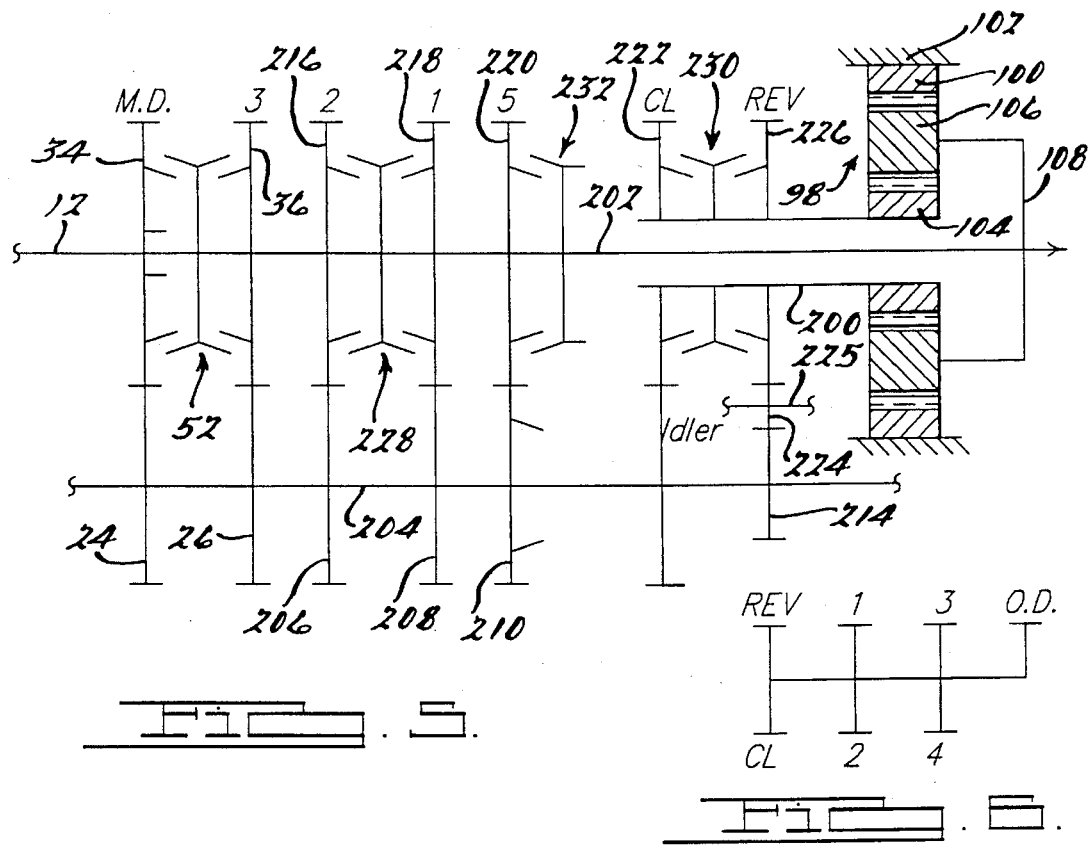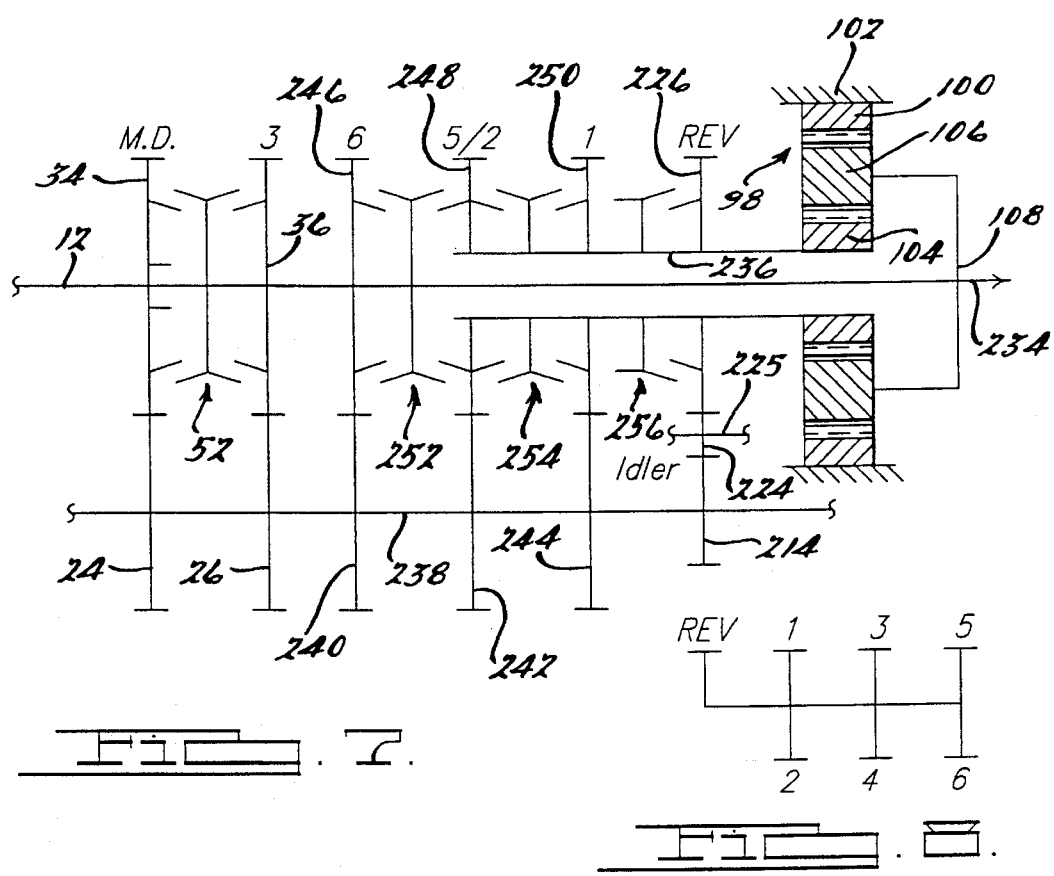

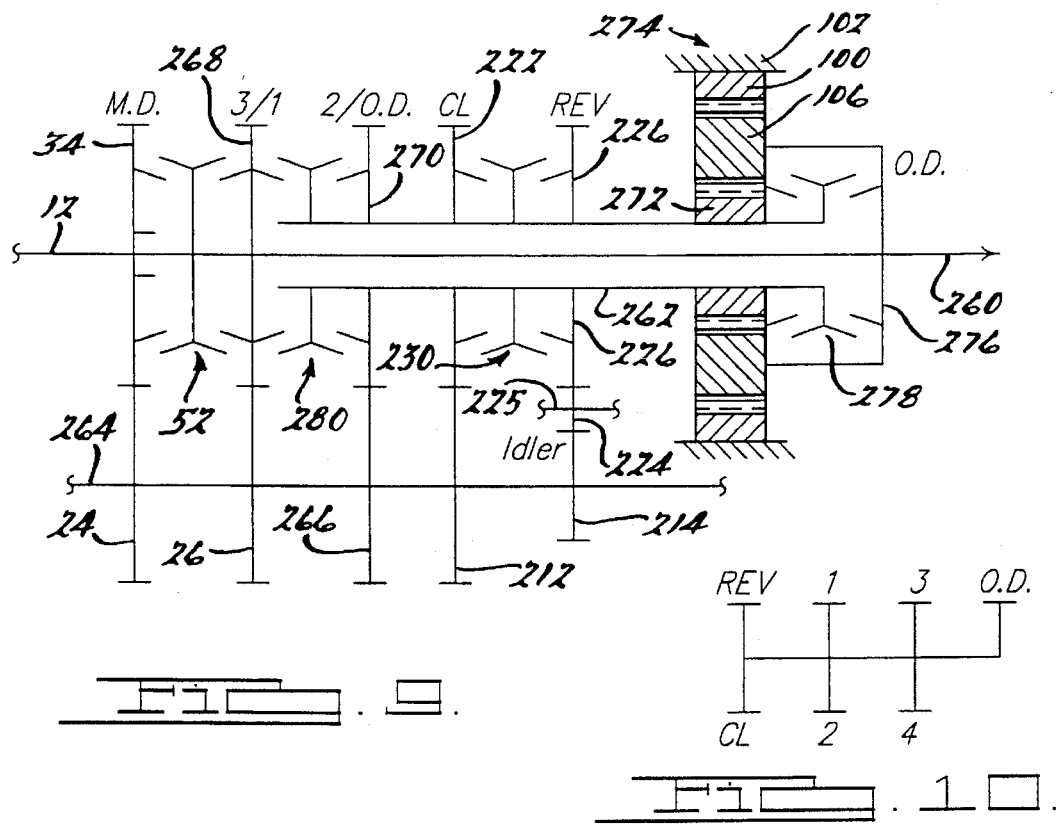
FIG. 9.
FIG. 10.
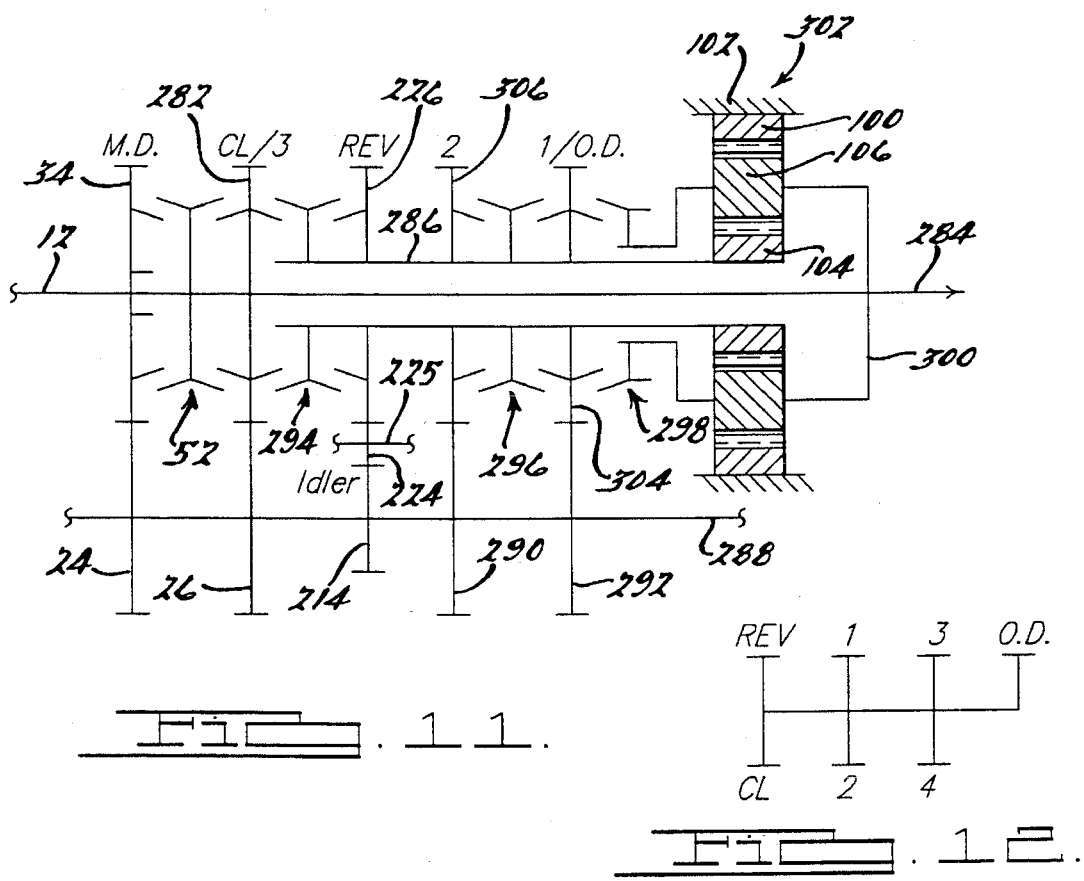
FIG. 11.
FIG. 12.

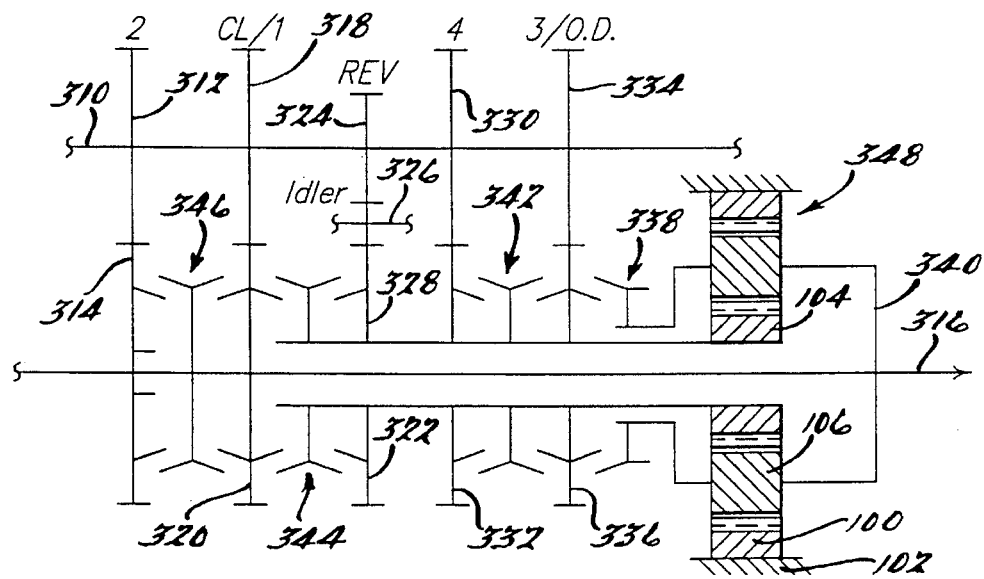
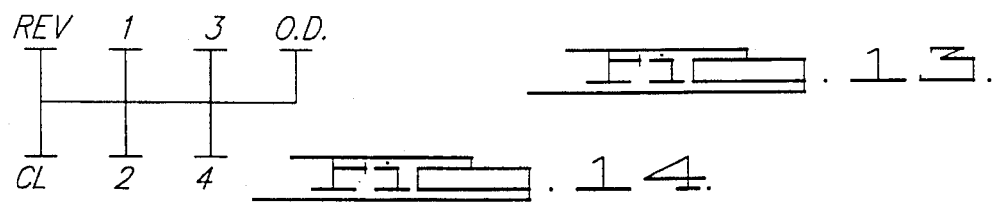
FIG. 13.
FIG. 14.
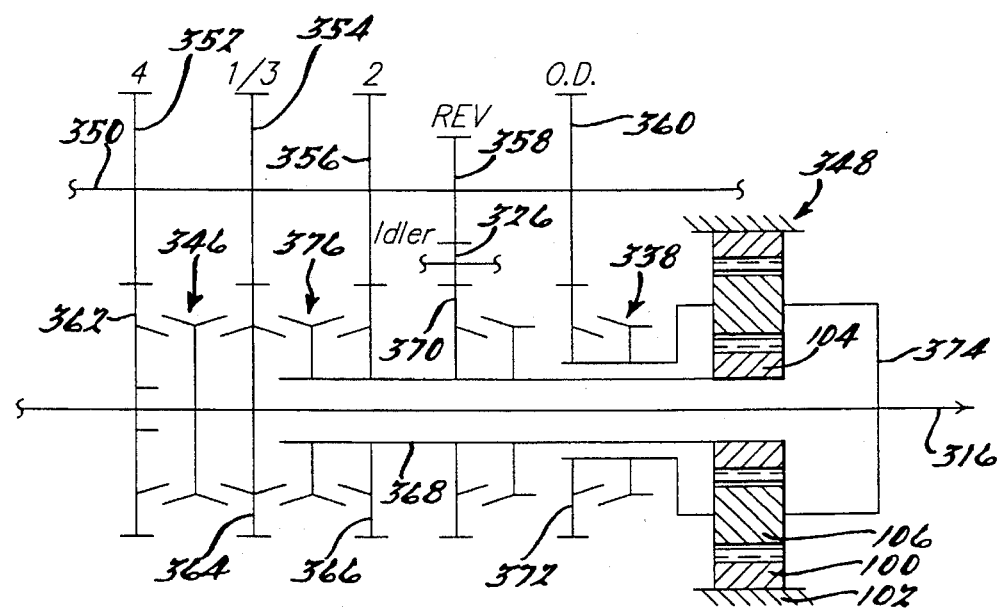
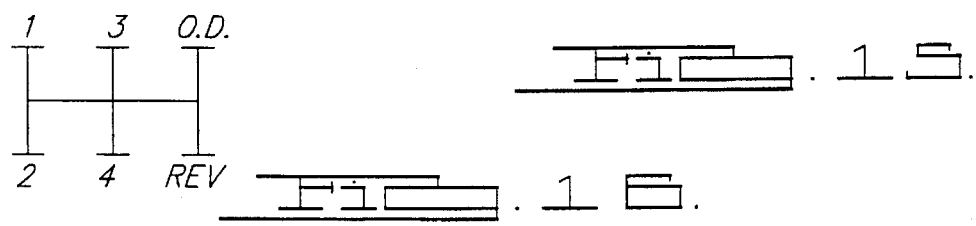
FIG. 15.
FIG. 16.

5,458,014

WIDE-RANGE MANUAL TRANSMISSION FOR MOTOR VEHICLES HAVING MAIN DRIVE GEARSET

BACKGROUND OF THE INVENTION

1. Field of the Invention

This invention pertains to the arrangement of gears, shafts, and synchronizers of an automotive transmission, especially to such a transmission of the type having an input shaft supported on a first axis, and an output shaft and intermediate shaft arranged parallel to the input shaft.

2. Description of the Prior Art

When the engine of a motor vehicle is idling and the neutral clutch that connects the engine to a manual transmission is disengaged, the speed of the engine varies as a result of cyclic irregularity intrinsic in the operation of an internal combustion engine. Countershaft manual transmissions for automotive use contain gear sets whose members are in continuous meshing engagement, though the gear selector of the transmission is in the neutral position. When the maindrive clutch is engaged and the gear selector is in the neutral position, speed changes of the engine transmitted to the gearset produce noise called "neutral rollover gear rattle." When the engaged gear teeth change position with respect to each other due to engine speed variations, the teeth of the driven gear contact alternately the driving face and the nondriving face of the driving pinion.

To reduce or eliminate this objectionable noise, various devices have been employed to take up clearances between the faces of the gear and mating pinion. These devices include a wheel coaxially arranged with the gear having similar teeth to those of the gear, and means for elastically maintaining the teeth of the gear in position that is angularly offset relative to the gear. A mechanical spring, usually a helical spring, located radially offset from the axis of the gear, applies a force directed tangentially to the axis tending to rotate the angular element with respect to the gear wheel. Other means such as elastomeric material have been used in the prior art to bias an angular member angularly with respect to a gear to maintain contact between the gear teeth in order to avoid gear rattle.

U.S. Pat. No. 4,718,295 describes use of a one-way clutch located on the input shaft between a gear wheel and a cylindrical surface of the shaft. The one-way clutch permits a one-way drive connection so that power can be transmitted through the clutch from the input shaft to either of two countershafts when fourth and fifth gear ratios are selected by the vehicle operator.

It is an object in the design of a manual transmission to minimize the effort required to make gear ratio changes, i.e., to reduce as much as possible the magnitude of force that must be applied to a shift mechanism to disengage a current gear ratio and to engage a new gear ratio. The magnitude of that force is to a great extent determined by the magnitude of inertia of rotating components that is reflected to the synchronizer units. Minimizing the weight of components of a motor vehicle is desired in order to reduce fuel consumption. Various attempts have been made to reduce noise produced by a manual transmission and to reduce rotating inertia of the gears, shafts, synchronizers and other such components.

SUMMARY OF THE INVENTION

It is an object of the present invention to provide a multiple-speed, motor vehicle manual transmission having minimum size, weight, and rotating inertia consistent with the requisite torque capacity. Use of a planetary gear unit to produce speed reduction in the lower speed ratios permits the diameters of mating pinions and gears to be smaller than otherwise they would be and helps to reduce the distance between the input shaft and intermediate and output shafts. The result is a compact transmission having a high power density, low rotating inertia and low weight.

In realizing these advantages the transmission according to the present invention includes an input shaft adapted for drivable connection to a power source, such as an internal combustion engine or motor, an output shaft and intermediate shaft arranged mutually coaxial and parallel to the input shaft, the output shaft being adapted for connection to a load.

Multiple pairs of gears and pinions have one member of each pair supported on the input shaft and another member of each pair supported on either the output shaft or intermediate shaft. These pairs of gears and pinions produce various speed reductions corresponding to the gear ratio selected by the vehicle operator. The gear of each gear-pinion pair that operates to produce the higher speed ratios is connected to the output shaft; the gear of each gear-pinion pair that operates to produce the lower forward speed ratios and the output member of a mechanism that operates to produce reverse drive are connected to the intermediate shaft.

A planetary gear unit is also employed to produce a speed reduction in certain selected gear ratios. The planetary gear unit includes a sun gear connected to the intermediate shaft, a ring gear fixed against rotation on the casing, a pinion carrier driveably connected to the output shaft, and a set of planet pinions in continual meshing engagement with the sun gear and ring gear, the pinion set being supported on the pinion carrier. The planetary gear unit can be arranged also such that the sun gear is fixed against rotation on the casing, the ring gear is connected to the intermediate shaft, the pinion carrier is driveably connected to the output shaft, and the set of planet pinions is in continual meshing engagement with the sun gear and ring gear, the pinion set being supported rotatably on the pinion carrier.

Synchronizers releasably connect and disconnect a member of each pinion-gear pair to the shaft on which each synchronizer is supported.

BRIEF DESCRIPTION OF THE DRAWING

FIG. 2 is a diagram representing the location of forward drive and reverse drive positions, among which the gearshift lever is moved to select the desired gear ratios.

FIG. 3 shows an alternate arrangement of the planetary gear unit in which the ring gear is driven and the sun gear is held.

FIG. 4 shows a mechanism for selecting and engaging the gear ratios of the transmission of FIG. 1.

FIG. 5 is a schematic diagram of a transmission according to this invention.

FIG. 6 shows the pattern of gear selector movement that produces the gear ratios of the transmission of FIG. 5.

FIG. 7 is a schematic diagram of a transmission according to this invention.

FIG. 8 shows the pattern of gear selector movement that produces the gear ratios of the transmission of FIG. 7.

FIG. 9 is a schematic diagram of a transmission according to this invention.

FIG. 10 hows the pattern of gear selector movement that produces the gear ratios of the transmission of FIG. 9.

FIG. 11 is a schematic diagram of a transmission according to this invention.

FIG. 12 shows the pattern of gear selector movement that produces the gear ratios of the transmission of FIG. 11.

FIG. 13 is a schematic diagram of a transmission according to this invention.

FIG. 14 is a schematic diagram showing the gearshift pattern traversed by the gearshift lever to produce the gear ratios of the transmission of FIG. 13.

FIG. 15 is a schematic diagram of a transmission according to the present invention.

FIG. 16 is a schematic diagram showing the gearshift pattern traversed by the gearshift lever to produce the gear ratios of the transmission of FIG. 15.

DESCRIPTION OF THE PREFERRED EMBODIMENT

Figure 1A:
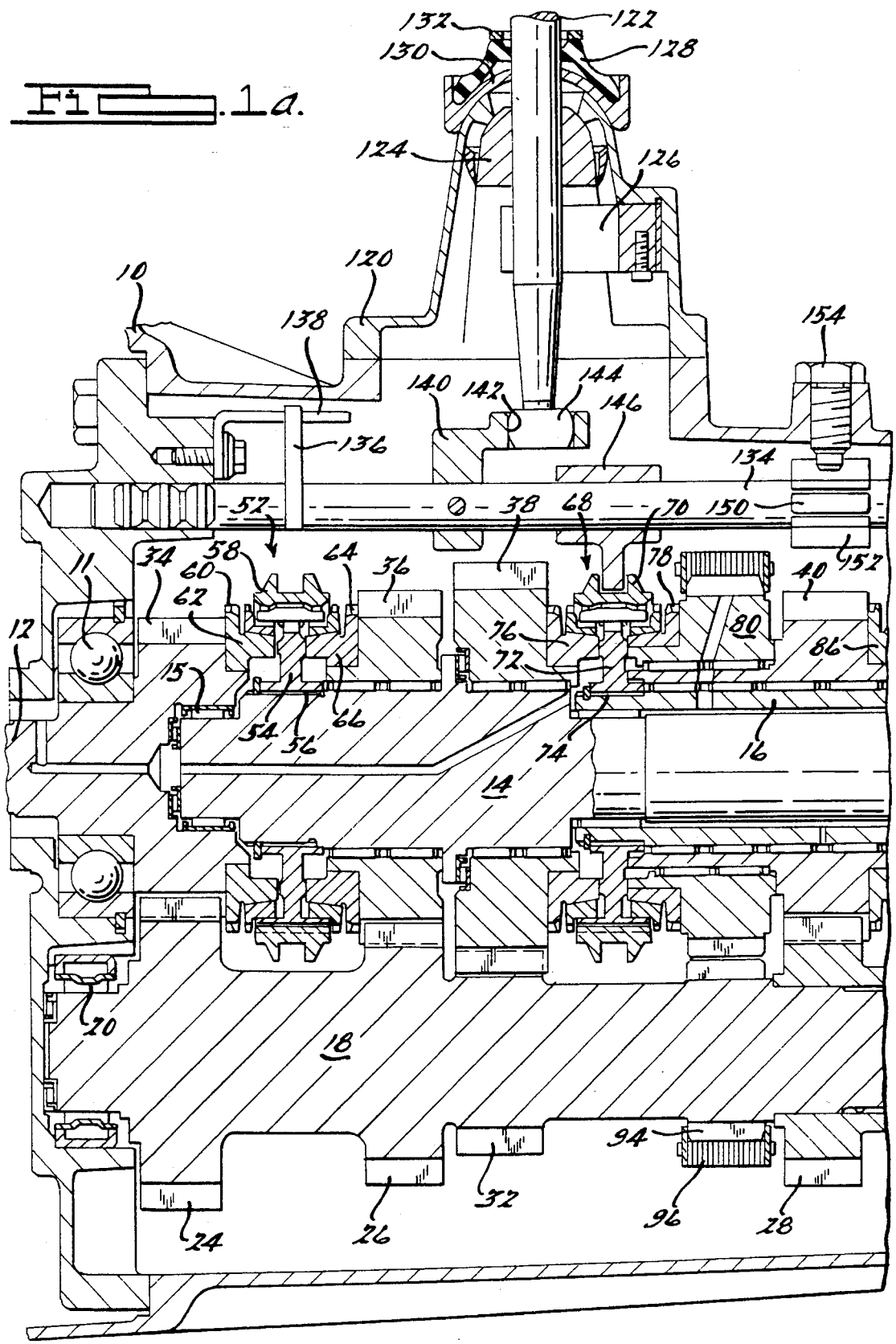
FIG. 1 is a cross section taken through a vertical plane through the transmission according to this invention.

Referring first to FIG. 1, the transmission, which is housed in mating casings, includes an input shaft 12 adapted for drivable connection to a power source such as an internal combustion engine. Located adjacent the input shaft is an output shaft 14 supported rotatably partially on a pocket bearing 15 located in a recess formed on the end of the input shaft. A sleeve shaft 16, aligned coaxially with the output shaft and input shaft, extends along a portion of the length of the output shaft. Bearings 11, 13 support these shafts on the casing 10.

A countershaft 18, supported at the transmission casing 10 on bearings 20, 22, is disposed parallel to shafts 12, 14, and 16. The countershaft carries a gear 24 associated with a fourth forward speed ratio; pinions 26, 28, 30, which are members of gear-pinion pairs associated with the third, first and second forward speed ratios; and pinion 32, a member of a creeper/low gear-pinion pair. Pinions 18, 30 are splined to countershaft 28.

Input shaft 12 carries a fourth speed ratio pinion 34, which is in continuous meshing engagement with gear 24.

Output shaft 14 supports gear 36, which is in continuous engagement with pinion 26, and gear 38, which is in continuous engagement with pinion 32.

Shaft 16 supports a first speed ratio gear 40, which continuously meshes with gear 28; and second speed ratio gear 42, which continually meshes with pinion 30. Second speed gear 42 includes a portion 44 that extends along the longitudinal axis on the outer surface of shaft 16 and supports a synchronizer 46 having hub, which is splined at 50 to gear 42.

Gears 36 and 38 are journalled on the outer surface of output shaft 14; gears 40 and 42 are journalled on the outer surface of shaft 16.

A 3-4 synchronizer 52 includes a hub 54 splined at 56 to the outer surface of shaft 14. Synchronizer 52 includes a sleeve 58, which moves rightward and leftward from the neutral position shown in FIG. 1 to positions of engagement with dog teeth 60, formed on the outer end of a conical ring 62 fixed to pinion 34, and dog teeth 64, formed on the surface of conical ring 66 fixed to gear 36. When synchronizer sleeve 58 moves leftward, synchronizer 52 connects input shaft 12 to output shaft 14. When sleeve 58 moves rightward, synchronizer 52 drivably connects gear 36 to output shaft 14.

Synchronizer 68 includes a sleeve 70 and a hub 72, which is splined at 74 to shaft 16. Sleeve 70 moves leftward into engagement with dog teeth formed on conical ring 76 fixed to gear 38, thereby drivably connecting gear 38 to shaft 16. The reverse drive sprocket wheel 80 is supported rotatably on an axially extending portion of gear 40. Countershaft 18 is formed with a sprocket wheel 94, which is aligned axially with sprocket wheel 80, these sprocket wheels being continually drivably connected by chainbelt 96. Sleeve 70 moves rightward into engagement with the dog teeth on conical ring 78 of sprocket wheel 80, thereby drivably connecting reverse sprocket wheel 80 to shaft 16.

Reverse drive can be produced instead by gears and a pinion. For example, sheave 94 and chain 96 can be replaced by a reverse pinion fixed to the countershaft at the location of sheave 94, and sheave 80 can be replaced by a reverse gear journalled on shaft 16 at the location of sheave 80. A reverse idler, rotatably supported on the casing and continually meshing with the reverse gear and reverse pinion, operates to reverse the direction of rotation of the reverse gear relative to input shaft 12. U.S. Pat. No. 4,377,093 describes a reverse drive gear mechanism of this type.

Synchronizer 82 includes a sleeve 84 having internal spline teeth that engage the dog teeth on synchronizer rings 86 and 88; and a hub 90, which is splined at 92 to the outer surface of shaft 16. When sleeve 84 moves leftward, it engages the dog teeth on conical ring 86 fixed to gear 40, thereby drivably connecting gear 40 to shaft 16. When sleeve 84 moves rightward, gear 42 is drivably connected to shaft 16 and gear 40 is released from shaft 16.

Planetary gear unit 98 includes ring gear 100, permanently held against rotation on casing portion 102; ring gear 104, permanently splined to shaft 16; planet pinions 106 in continuously meshing engagement with the ring gear and sun gear; and pinion carrier 108, which rotatably supports the set of planet pinions and is splined at 110 to output shaft 14. In the arrangement of FIG. 1, the sun gear is the torque input, the torque reaction is located at the ring gear 100, and the output is taken at the pinion carrier 108 and output shaft 14.

Synchronizer 46 includes a sleeve 112 having internal spline teeth that engage the dog teeth 114 on a conical ring, which is drivably connected to pinion carrier 108. When synchronizer sleeve 112 moves rightward, it produces a drivable connection between pinion carrier 108 and second speed ratio gear 42 through spline 50 and hub 48.

FIG. 3 shows an alternate arrangement of the planetary gear unit 98' in which shaft 16' is drivably connected to ring gear 100' so that the ring gear and shaft 16' turn as a unit. Sun gear 104' is held against rotation on transmission casing 102'. Carrier 108' is drivably connected to output shaft 14' and rotatably supports a set of planet pinions 106', which are in continuous meshing engagement with the ring gear and sun gear. In this arrangement, the ring gear 100' is driven, the torque reaction is provided at the sun gear 104', and the output is taken on the carrier 108' and output shaft 14'.

The transmission casing includes a casing portion 120, which supports a shift lever 122 that moves among the gear selector positions shown in FIG. 2. Casing portion 120 supports a ball 124, through which shift lever 122 extends, thereby providing a universal pivoting support for the shift lever. A leaf spring 126 biases the shift lever to a particular predetermined position when the vehicle operator is not manipulating the shift lever. Preferably, the leaf spring biases the shift lever toward the neutral position in the 1-2 shift plane of FIG. 2. A seal 130 protects against passage of contaminants into housing 120, cover 128 closes the upper portion of the shift lever, and snap ring 132 maintains the position of the shift lever relative to the cover.

A shift rail 134, supported slidably for movement along its axis within bores formed on the casing 10, carries a pin 136 that extends radially into a system of interconnected slots formed in a gate plate 138, the slots defining the 1-2, 3-4, R-CL, and OD vertical planes and the horizontal neutral plane shown in FIG. 2. A gate plate and pin combination of this type is described and illustrated in U.S. Pat. No. 4,297,910, whose assignee is the owner of the present invention.

Pinned to shift rail 134 is a socket 140 having a bore 142, into which a spherical ball 144 located at the end of the shift lever is fitted. Shift rail 134 carries several shift forks 146, 148, and other forks not shown in FIG. 1, but illustrated in FIG. 4. Each shift fork engages a synchronizer sleeve 58, 70, 84, 112, thereby transmitting movement of the shift lever through socket 140, the shift fork associated with the selected ratio, and the appropriate synchronizer sleeve. Rail 134 carries a radially directed finger 150 and an interlock sleeve 152, which is held by bolt 154 against displacement along the axis of rail 134.

Each shift fork includes an arm that extends to the vicinity of bolt 154 or bolt 192 and provides a slot aligned with the radial path of the shift fingers 150 or 188 as it rotates about the axis of shift rail 134 due to displacement of the shift selector 122 along the neutral horizontal plane of the diagram of FIG. 2. When a selector finger rotates into engagement with a slot on a shift fork corresponding to the position of the selected gear ratio, the shift fork is subsequently moved axially causing the associated synchronizer sleeve to engage and to connect the selected gear, pinion, sleeve, or carrier with the shaft on which the hub of the corresponding synchronizer is supported.

The mechanism that transmits movement of the gear shift lever to the components of the transmission that engage and release the selected gear ratios is shown in greater detail in FIG. 4. In addition to the components of the shift mechanism described with reference to FIG. 1 above, the mechanism includes a lower shift rail 170, which is journalled at the left-hand side on casing 10, and at the right-hand side on a web 172 formed integrally with casing 10. Rail 170 carries a 1-2 shift fork 174, which is in continuous engagement with an annular recess 176 formed on the outer surface of the 1-2 synchronizer sleeve 84.

Bracket 178, fixed to the an inner surface of casing 10, provides a pivotal support 180 for a shift lever 182 that extends between lower rail 170 and control rail 134. At the lower end of the lever, a slotted hole 184 receives a pin 186, which extends radially from the axis of rail 170 and fits within hole 184 with a close fit along the axis of the lower rail and with a slotted fit in the direction perpendicular to the axis of the lower rail. The upper end of lever 182 is engageable by a finger 188, which extends radially from the axis of control rail 134 and rotates into engagement with the upper end of lever 182 when control rail 134 is rotated about its axis. Finger 188 moves along the axis of rail 134 during movement of shift lever 122, thereby pivoting lever 182 and displacing lower rail 170, the 1-2 shift fork 174, and synchronizer sleeve 84. This action moves the 1-2 synchronizer 82 into and out of drivable engagement with first speed gear 40 and second speed gear 42.

Control rail 134 supports a 3-4 shift fork 190, which is in continuous engagement with an annular slot on the outer surface of the 3-4 synchronizer sleeve 58. As control rail 134 rotates about its axis, shift finger 188 moves into engagement with fork 190 and then moves synchronizer sleeve 58 along the axis of rail 134 in response to movement of the shift selector 122. This action engages and releases a connection between output shaft 14 and third speed gear 36 or fourth speed pinion 34. Second interlock bolt 192, similar to bolt 154, holds an interlock sleeve 194, which surrounds rail 134, against axial displacement.

The shift mechanism interlock described in U.S. Pat. No. 4,377,093 is substantially identical to the interlock described here with reference to the shift control rail 134.

In operation, the lowest gear ratio, creeper/low, is produced by the transmission when synchronizer sleeve 70 is moved leftward, thereby drivably connecting creeper/low gear 38 to shaft 16. The torque delivery path includes input shaft 12, pinion 34, gear 24, countershaft 18, pinion 32, gear 38, synchronizer 68, shaft 16, planetary gear unit 98, carrier 108, and output shaft 14. The planetary gear unit produces a speed reduction between shaft 10 and output shaft 14 in addition to the speed reduction produced by pinion-gear 34, 24 and pinion gear 32, 38 between input shaft 12 and shaft 16.

The first forward gear ratio is produced by moving sleeve 84 of synchronizer 82 leftward into engagement with the dog teeth of first speed gear 40 and moving the other synchronizers to the neutral position. The torque delivery path between the input shaft and output shaft, which produces a slight speed increase through the main drive gearset that includes pinion 34 and gear 24, includes also countershaft 18, pinion 28, gear 40, synchronizer 82, shaft 16, planetary gear unit 98, and carrier 108, which drives output shaft 14.

The second forward speed ratio is produced when synchronizer sleeve 84 is moved rightward to connect the second speed gear 42 and shaft 16 while maintaining the other synchronizers in their neutral positions. The torque delivery path includes the main drive, pinion 34 and gear 24, countershaft 18, second ratio pinion 30, second ratio gear 42, synchronizer 82, shaft 16, planetary gear unit 98, and carrier 108, which drives the output shaft 14.

The third forward gear ratio results when synchronizer sleeve 58 is moved rightward to drivably connect third ratio gear 36 to output shaft 14. The torque delivery path includes input shaft 12, pinion 34, gear 24, countershaft 18, pinion 26, gear 36, synchronizer 52, and output shaft 14.

The transmission produces the fourth speed ratio, a direct drive connection between the input shaft and output shaft when synchronizer sleeve 58 is moved leftward. This action produces a drive connection between the clutch teeth 60 on synchronizer ring 62, which is formed integrally with input shaft 12, and output shaft 14, through synchronizer hub 54 and spline connection 56.

The fifth forward speed ratio, an overdrive ratio, is produced by moving synchronizer sleeve 112 rightward into engagement with planetary pinion carrier 114, thereby drivably connecting gear 42 and the output shaft 14 through synchronizer 46 and carrier 108. The torque delivery path includes input shaft 12, main drive pinion 34, gear 24, countershaft 18, second ratio pinion 30, second ratio gear 42, synchronizer 46, carrier 108, and output shaft 14.

The reverse drive ratio is produced by moving synchronizer sleeve 70 rightward into engagement with the dog teeth on cone ring 78 formed integrally with reverse output sheave 80. When synchronizer sleeve 70 engages the reverse sheave 80, it completes a drive connection between sheave 80 and shaft 16, which drives sun gear 104. The output is taken at pinion carrier 108 and output shaft 14. The torque delivery path for reverse drive includes input shaft 12, main drive pinion 34, gear 24, countershaft 18, reverse input sheave 94, chain 96, reverse output sheave 80, synchronizer 68, shaft 16, pinion carrier 108, and output shaft 14.

Referring now to FIG. 5, the intermediate shaft 200 and output shaft 202 are aligned with the axis of input shaft 12, and countershaft 204 is disposed parallel to the other shafts. Fixed to the countershaft is a fourth speed gear 24, third speed pinion 26, second speed pinion 206, first speed pinion 208, fifth speed pinion 210, creeper low pinion 212, and reverse pinion 214. The members of the gear-pinion pairs supported on the countershaft are in continuous meshing engagement, respectively, with the other members journalled on the output shaft and intermediate shaft, including the main drive pinion 34, third speed gear 36, second speed gear 216, first speed gear 218, fifth speed gear 220, and creeper low gear 222. A reverse idler 224, which is rotatably supported on a stub shaft 225, is in continuous meshing engagement with reverse gear 226 and reverse pinion 214.

In the arrangement of FIG. 5, synchronizer 228 alternately connects and releases gears 216 and 218 to the output shaft, and synchronizer 230 alternately connects and releases gears 222 and 226 to the intermediate shaft 200. Synchronizer 232 holds and releases gear 220 and shaft 202.

Operation of the transmission of FIG. 5 is essentially identical to that of FIG. 1, except that only the creeper-low gear 222 and reverse gear 226, when selected by the vehicle operator, produce their respective gear ratios through operation of planetary gear unit 98. In each of these embodiments, the alternate embodiment of the planetary gear unit 98' shown in FIG. 3 can be substituted for gear unit 98.

In the arrangement of FIG. 7, output shaft 234 and intermediate shaft 236 are arranged coaxially with input shaft 12, and countershaft 238 is arranged parallel to the other shafts. Fixed to countershaft 238 are main drive gear 24, third speed pinion 26, sixth speed pinion 240, second-fifth speed pinion 242, first speed pinion 244, and reverse pinion 214. Journalled on the outer surface of output shaft 234 are third speed gear 36 and sixth speed gear 246. Journalled on the outer surface of intermediate shaft 236 are gear 248, first speed gear 250, and reverse gear 226.

Synchronizer 52 alternately engages and releases main drive pinion 34, which is fixed to input shaft 12, and third speed gear 36, respectively, to the output shaft. Synchronizer 252 alternately connects and releases a drive connection between sixth speed gear 246 and fifth gear 248, respectively, and shaft 234 when sixth gear and fifth gear are selected.

Synchronizer 254 alternately connects and releases 248 and 250 to the intermediate shaft 236, synchronizer 256 alternately connects and releases reverse output gear 226 and intermediate shaft 236. The input shaft drives the countershaft through the gear-pinion pair 24, 34. The first and second speed ratios are produced partially through operation of synchronizer 254 and partially through operation of the planetary gear unit 98. The reverse gear ratio is produced partially through operation of synchronizer 256 and planetary gear unit 98. Synchronizer 252 connects gear 248 to output shaft 234, thereby bypassing planetary gear unit when the sixth speed ratio is selected. Synchronizer 52 produces a direct drive connection between input shaft and the output shaft. The third and fourth forward speed ratios, and the fifth and sixth speed ratios are produced through operation of synchronizers 52 and 252, respectively, by connecting gears 34, 36 and 246, 248 alternately to the output shaft, thereby bypassing gear unit 98.

The gear arrangement of FIG. 7 permits one gear (gear 248) of a gear-pinion pair to participate in the production of the second speed ratio and fifth speed ratio.

Referring now to FIG. 9, output shaft 260 and intermediate shaft 262 are arranged coaxially with input shaft 12, and countershaft 264 is supported rotatably on the transmission casing parallel to the other shafts. Formed integrally or drivably fixed to the countershaft are main drive gear 24, first-third speed pinion 26, second-overdrive pinion 266, creeper-low pinion 212, and reverse pinion 214. Main drive pinion 34 is fixed to the input shaft and is in continuous meshing engagement with main drive gear 24. First-third speed gear 268 is journalled on the output shaft and is in continuous meshing engagement with pinion 26. Journalled on the outer surface of intermediate shaft 262 is a second-overdrive speed gear 270, which is in mesh with pinion 266; creeper-low gear 222, which is in mesh with pinion 212; and reverse gear 226, which is in mesh with reverse idler 224.

The sun gear 272 of the planetary gear unit 274 and the pinion carrier 276 are drivably connected to the intermediate shaft through operation of synchronizer 278, which has a hub supported on the intermediate shaft and a clutch sleeve that is moved rightward into engagement with carrier 276 and leftward into engagement with sun gear 272.

The fourth speed ratio, a direct drive ratio, is produced when the sleeve of synchronizer 52 moves leftward, thereby connecting input shaft 12 to the output shaft 260. The third speed ratio is produced by moving the sleeve of synchronizer 52 rightward, thereby connecting gear 268 to the output shaft.

The first speed ratio is produced by moving the sleeve of synchronizer 280 leftward, thereby connecting gear 268 to intermediate shaft 262. An additional speed reduction and torque multiplication occurs through operation of planetary gear unit 274 by connecting one of either ring gear 100 or sun gear 272 to the intermediate shaft and holding the other of those elements fixed against rotation on the transmission casing. The output is taken at carrier 276 and the output shaft 260.

The second speed ratio is produced in a way that is similar to the production of the first speed ratio. The sleeve of synchronizer 280 is moved rightward to connect gear 270 to the intermediate shaft. An additional speed reduction occurs within the planetary gear unit 274 and the output is taken at carrier 276.

In a way similar to that of the transmission of FIG. 5, the creeper-low speed ratio is produced by moving the sleeve of synchronizer 230 leftward, thereby connecting creeper-low gear 222 to the intermediate shaft and to the input of planetary gear unit 274. The output is taken at the carrier 276 and output shaft 260. Similarly, reverse drive results by moving the sleeve of synchronizer 230 rightward, thereby drivably connecting reverse gear 226 to the intermediate shaft and the input of planetary gear unit 274. Again, the output is taken at carrier 276.

The sleeve of synchronizer 278 moves between two positions: a leftward position where sun gear 272, which is journalled on shaft 262, is drivably connected to intermediate shaft 262; and a rightward position where the sun gear is disengaged from the intermediate shaft and carrier 276 is drivably connected to the intermediate shaft.

The fifth speed ratio, an overdrive ratio, is produced by manipulating synchronizers 280 and 278. The sleeve of synchronizer 280 is moved rightward, as it is to produce the second forward speed ratio, thereby connecting gear 280 to intermediate shaft 262, and the sleeve of synchronizer 278 is moved rightward, thereby drivably connecting the intermediate shaft directly to carrier 276 and output shaft 260. This action disengages sun gear 272 from connection with intermediate shaft 262 and prevents the planetary gear unit from producing a speed reduction.

Referring now to FIG. 11, output shaft 284 and intermediate shaft 286 are arranged coaxially with input shaft 12, and countershaft 288 is supported on the transmission casing at a position parallel to the other shafts. Fixed to the countershaft are main drive gear 24, third speed-creeper-low speed pinion 26, reverse pinion 214, second speed pinion 290, and first speed-overdrive pinion 292.

Journalled on intermediate shaft 286 are gears 282, 226, 306, 304, which are continuously in mesh with pinions 26, 214, 290, 292, respectively. Countershaft 288 is driven by main drive pinion 34 and gear 24.

Synchronizer 52 is supported on the output shaft; synchronizers 294 and 296 are supported on intermediate shaft, and synchronizer 298 is supported on carrier 300 of the planetary gear unit 302.

To produce the first forward speed ratio, the sleeve of synchronizer 296 is moved rightward, thereby drivably connecting the overdrive gear 304 to the intermediate shaft and sun gear 104. Pinion 292 is driven from the main drive pinion gearset 24, 34. The planetary gear unit provides an additional speed reduction; the output taken on the carrier 300 and output shaft 284, ring gear 100 is held and sun gear 104 is driven.

Similarly, the second forward speed ratio is produced when the sleeve of synchronizer 296 is moved leftward to connect the second speed gear 306 to the intermediate shaft and sun gear 104. The output is taken at carrier 300 and ring gear 100 is fixed against rotation.

The third forward speed ratio is produced when the sleeve of synchronizer 52 is moved rightward to connect gear 282 to the intermediate shaft and sun gear 104. The fourth forward speed ratio, a direct drive ratio, is produced when the sleeve of synchronizer 52 is moved leftward to connect the input shaft and output shaft. The lowest gear ratio, the creeper-low speed ratio, is produced by moving the sleeve of synchronizer 294 leftward to connect gear 282 to the intermediate shaft and sun gear 104.

The fifth forward speed ratio, an overdrive ratio, results when the sleeve of synchronizer 298 is moved leftward to drivably connect gear 304 to the carrier of the planetary gear unit 302 and the output shaft 284, thereby eliminating the speed reduction of the planetary gear unit.

To produce reverse drive, the sleeve of synchronizer 294 is moved rightward to drivably connect reverse gear 226 to the intermediate shaft and sun gear 104. The output is taken at carrier 300, and ring gear 100 is held against rotation on the casing.

In the transmission of FIGS. 13 and 15, there is no main drive pinion-gear pair. Instead, all of the gears carried on the input shaft are fixed to the input shaft, and there is no countershaft. An intermediate shaft and output shaft are arranged mutually coaxially and parallel to the input shaft.

Referring to FIG. 13, input shaft 310, adapted to be connected to a power source, such as an internal combustion engine, has fixed to it the following pinions: a second speed ratio pinion 312, which meshes with gear 314 journalled on output shaft 316; a creeper low/pinion 318, which meshes with corresponding gear 320 journalled on intermediate shaft 322; reverse pinion 324, which meshes with reverse idler 326, which meshes with reverse gear 328 journalled on the intermediate shaft; fourth speed pinion 330, which meshes with fourth speed gear 332 journalled on the intermediate shaft; and third speed-overdrive pinion 334, which meshes with corresponding gear 336 journalled on the intermediate shaft.

Synchronizer 338 alternately releases and connects gear 336, carrier 340, and output shaft 316. Synchronizer 342 alternately connects and releases gears 322, 336, and intermediate shaft 322. Synchronizer 344 alternately connects and releases gears 320, 328, and the intermediate shaft. Synchronizer 346 alternately connects and releases gears 314, 320, and output shaft 316.

The torque delivery path for the lowest forward gear ratio, the creeper low ratio, includes input shaft 310, pinion 318, gear 320, synchronizer 344, intermediate shaft 322, sun gear 104 of planetary gear unit 348, carrier 340, and output shaft 316.

The torque delivery path for the first forward speed ratio includes input shaft 310, pinion 318, gear 320, synchronizer 346, and output shaft 316. The torque delivery path for the second forward speed ratio includes input shaft 310, pinion 312, gear 314, synchronizer 346, and output shaft 316.

The torque delivery path for the third forward speed ratio includes input shaft 310, pinion 334, gear 336, synchronizer 342, intermediate shaft 322, planetary gear unit 348, carrier 340, and output shaft 316. The torque delivery path for the fourth speed ratio includes input shaft 310, pinion 330, gear 332, synchronizer 342, gear unit 348, and output shaft 316.

The torque delivery path for the overdrive forward speed ratio includes input shaft 310, pinion 334, gear 336, synchronizer 338, and output shaft 316.

The torque delivery path for the reverse drive includes input shaft 310, pinion 324, idler 326, gear 328, synchronizer 344, intermediate shaft 322, sun gear 104, planetary gear unit 348, carrier 340, and output shaft 316.

The transmission of FIG. 15 is similar to that of FIG. 13, except that it produces only five forward speed ratios, including an overdrive ratio.

Fixed to input shaft 350 are fourth speed pinion 352, first speed-third speed pinion 354, second speed pinion 356, reverse pinion 358, and overdrive pinion 360. Pinion 352 is in continual meshing engagement with fourth speed gear 362, which is journalled on output shaft 316. Pinion 354 continually meshes with gear 364, which is journalled on the output shaft. The second speed pinion 356 continually meshes with second speed gear 366, which is journalled on the outer surface of intermediate shaft 368. Reverse gear 370 is in continual meshing engagement with reverse idler 326, which meshes with reverse gear 358 journalled on shaft 368. The overdrive pinion 360 continually meshes with the corresponding gear 372, which is journalled on the outer surface of pinion carrier 374 of planetary gear unit 348.

The torque delivery path of the first forward speed ratio includes input shaft 350, pinion 354, gear 364, synchronizer 376, shaft 368, sun gear 104, carrier 374, and output shaft 316.

The torque delivery path of the second forward speed ratio includes input shaft 350, pinion 356, gear 366, synchronizer 376, shaft 368, sun gear 104, carrier 374, and output shaft 316.

The torque delivery path of the third forward speed ratio includes input shaft 350, pinion 354, gear 364, synchronizer 346, and output shaft 316.

The torque delivery path of the fourth forward speed ratio includes input shaft 350, pinion 352, gear 362, synchronizer 346, and output shaft 316.

The torque delivery path of the fifth forward speed ratio, an overdrive ratio, includes input shaft 350, pinion 360, gear 372, synchronizer 338, carrier 374, and output shaft 316.

The transmission illustrated in FIGS. 13 and 14 are particularly suited for transaxles or rear wheel drive applications.

Having described the preferred embodiment of my invention, what we claim and desire to secure by U.S. Letters Patent is:

1. A transmission for producing multiple speed ratios, comprising:

an input shaft;

an output shaft disposed substantially parallel to the input shaft;

an intermediate shaft substantially coaxial with the output shaft;

multiple pairs of pinions and gears, the members of each pair being in continual mutual meshing engagement, a first member of each pair supported on the input shaft, a second member of a first pair supported on the output shaft and a second member of a second pair supported on the intermediate shaft, each pair associated with a speed ratio;

a planetary gear unit including a sun gear, a ring gear, a carrier driveably connected to the output shaft, and planet pinions supported on the pinion carrier in continual meshing engagement with the sun gear and ring gear, one component of the group consisting of the ring gear and sun gear being driveably connected to the intermediate shaft, the other component of said group being fixed against rotation, the carrier connected to the output shaft; and means for releasably connecting a member of a pinion-gear pair to the output shaft and for releasably connecting a member of another pinion-gear pair to the intermediate shaft.

2. The transmission of claim 1 wherein the planetary gear unit includes:

a sun gear connected to the intermediate shaft;

a ring gear fixed against rotation;

a carrier driveably connected to the output shaft; and planet pinions supported on the pinion carrier, in continual meshing engagement with the sun gear and ring gear.

3. The transmission of claim 1 wherein the planetary gear unit includes:

a ring gear connected to the intermediate shaft;

a sun gear fixed against rotation;

a carrier driveably connected to the output shaft; and planet pinions supported on the pinion carrier, in continual meshing engagement with the sun gear and ring gear.

4. The transmission of claim 1 wherein the connecting means comprises:

first synchronizer means, carried on the output shaft, for mutually connecting and releasing a member of a first and second pinion-gear pairs, respectively, and the output shaft;

second synchronizer means, carried on the intermediate shaft, for mutually connecting and releasing alternately a member of the second and a third pinion-gear pairs, respectively, and the intermediate shaft;

third synchronizer means, carried on the intermediate shaft, for mutually connecting and releasing alternately a member of a fourth and fifth pinion-gear pairs, respectively, and the intermediate; and fourth synchronizer means, carried on the carrier, for mutually connecting and releasing alternately said member of the fifth pinion-gear pair and carrier.

5. The transmission of claim 4 wherein the planetary gear unit includes:

a sun gear connected to the intermediate shaft;

a ring gear fixed against rotation;

a carrier driveably connected to the output shaft; and planet pinions supported on the pinion carrier, in continual meshing engagement with the sun gear and ring gear.

6. The transmission of claim 4 wherein the planetary gear unit includes:

a ring gear connected to the intermediate shaft;

a sun gear fixed against rotation;

a carrier driveably connected to the output shaft; and planet pinions supported on the pinion carrier, in continual meshing engagement with the sun gear and ring gear.

7. The transmission of claim 1 wherein the connecting means comprises:

first synchronizer means, carried on the output shaft, for mutually connecting and releasing a member of a first pinion-gear pair and a member of a second pinion-gear pair, alternately, and the output shaft;

second synchronizer means, carried on the intermediate shaft, for mutually connecting and releasing a member of the second pinion-gear pair and a member of a third pinion-gear pair, alternately, and the intermediate shaft;

third synchronizer means, carried on the intermediate shaft, for mutually connecting and releasing alternately the intermediate shaft and a member of a fourth pinion-gear pair; and fourth synchronizer means for mutually connecting and releasing alternately the output shaft and a member of a fifth pinion-gear pair.

8. The transmission of claim 7 wherein the planetary gear unit includes:

a sun gear connected to the intermediate shaft;

a ring gear fixed against rotation;

a carrier driveably connected to the output shaft; and planet pinions supported on the pinion carrier, in continual meshing engagement with the sun gear and ring gear.

9. The transmission of claim 7 wherein the planetary gear unit includes:

a ring gear connected to the intermediate shaft;

a sun gear fixed against rotation;

a carrier driveably connected to the output shaft; and planet pinions supported on the pinion carrier, in continual meshing engagement with the sun gear and ring gear.

10. A multiple speed transmission for producing multiple speed ratios, comprising:

an input shaft;

an output shaft disposed substantially parallel to the input shaft;

an intermediate shaft substantially coaxial with the output shaft;

multiple pairs of gears and pinions, the members of each pair in continual mutual meshing engagement, each pair associated with a speed ratio, a first member of each pair supported on the input shaft, a second member of a pair associated with a low speed ratio and connectable to the intermediate shaft, a second member of another pair associated with a high speed ratio and connectable to the output shaft;

a planetary gear unit including a sun gear, a ring gear, a pinion carrier driveably connected to the output shaft, and planet pinions supported on the pinion carrier in continual meshing engagement with the sun gear and ring gear, one component of the group consisting of the ring gear and sun gear being driveably connected to the intermediate shaft, the other component of said group being fixed against rotation; and means for releasably connecting a member of a pinion-gear pair to the output shaft and for releasably connecting a member of another pinion-gear pair to the intermediate shaft.

11. The transmission of claim 10 wherein the planetary gear unit includes:

a sun gear connected to the intermediate shaft;

a ring gear fixed against rotation;

a carrier driveably connected to the output shaft; and planet pinions supported on the pinion carrier, in continual meshing engagement with the sun gear and ring gear.

12. The transmission of claim 10 wherein the planetary gear unit includes:

a ring gear connected to the intermediate shaft;

a sun gear fixed against rotation;

a carrier driveably connected to the output shaft; and planet pinions supported on the pinion carrier, in continual meshing engagement with the sun gear and ring gear.

13. The transmission of claim 10 wherein the connecting means comprises:

first synchronizer means, carried on the output shaft, for mutually connecting and releasing a member of a first and second pinion-gear pairs, respectively, and the output shaft;

second synchronizer means, carried on the intermediate shaft, for mutually connecting and releasing alternately a member of the second and a third pinion-gear pairs, respectively, and the intermediate shaft;

third synchronizer means, carried on the intermediate shaft, for mutually connecting and releasing alternately a member of a fourth and fifth pinion-gear pairs, respectively, and the intermediate; and fourth synchronizer means, carried on the carrier, for mutually connecting and releasing alternately said member of the fifth pinion-gear pair and carrier.

14. The transmission of claim 13 wherein the planetary gear unit includes:

a sun gear connected to the intermediate shaft;

a ring gear fixed against rotation;

a carrier driveably connected to the output shaft; and planet pinions supported on the pinion carrier, in continual meshing engagement with the sun gear and ring gear.

15. The transmission of claim 13 wherein the planetary gear unit includes:

a ring gear connected to the intermediate shaft;

a sun gear fixed against rotation;

a carrier driveably connected to the output shaft; and planet pinions supported on the pinion carrier, in continual meshing engagement with the sun gear and ring gear.

16. The transmission of claim 10 wherein the connecting means comprises:

first synchronizer means, carried on the output shaft, for mutually connecting and releasing alternately a member of a first and second pinion-gear pairs, respectively, and the output shaft;

second synchronizer means, carried on the intermediate shaft, for mutually connecting and releasing alternately said member of the second and a third pinion-gear pairs, respectively, and the intermediate shaft;

third synchronizer means, carried on the intermediate shaft, for mutually connecting and releasing alternately the intermediate shaft and a member of a fourth pinion-gear pair; and fourth synchronizer means for mutually connecting and releasing alternately the output shaft and a member of a fifth pinion-gear pair.

17. The transmission of claim 16 wherein the planetary gear unit includes:

a sun gear connected to the intermediate shaft;

a ring gear fixed against rotation;

a carrier driveably connected to the output shaft; and planet pinions supported on the pinion carrier, in continual meshing engagement with the sun gear and ring gear.

18. The transmission of claim 16 wherein the planetary gear unit includes:

a ring gear connected to the intermediate shaft;

a sun gear fixed against rotation;

a carrier driveably connected to the output shaft; and planet pinions supported on the pinion carrier, in continual meshing engagement with the sun gear and ring gear.

* * * * *